US006369802B1

(12) United States Patent
Ebisawa

(10) Patent No.: US 6,369,802 B1
(45) Date of Patent: *Apr. 9, 2002

(54) HANDWRITTEN DATA INPUT DEVICE HAVING COORDINATE DETECTION TABLET

(75) Inventor: Isao Ebisawa, Hamura (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,230

(22) Filed: Mar. 27, 1998

(30) Foreign Application Priority Data

Apr. 1, 1997 (JP) .............................. 9-096353

(51) Int. Cl.$^7$ ................................. G09G 5/00
(52) U.S. Cl. ..................................... 345/173
(58) Field of Search ................. 395/800, 149, 395/326; 345/173; 178/18; 364/708.1; 382/187–189; 361/679–683; 428/209

(56) References Cited

U.S. PATENT DOCUMENTS

| | | | |
|---|---|---|---|
| 4,641,354 A | * | 2/1987 | Fukunaga et al. ............. 382/13 |
| 5,133,076 A | * | 7/1992 | Hawkins et al. ............. 395/800 |
| 5,411,790 A | * | 5/1995 | Ogawa et al. ............. 428/209 |
| 5,455,901 A | * | 10/1995 | Friend et al. ................ 395/149 |
| 5,502,461 A | * | 3/1996 | Okamoto et al. ........... 345/173 |
| 5,513,278 A | * | 4/1996 | Hashizume et al. ........ 382/187 |
| 5,587,560 A | * | 12/1996 | Crooks et al. ................. 178/18 |
| 5,600,781 A | * | 2/1997 | Root et al. ................... 395/326 |
| 5,629,499 A | * | 5/1997 | Flickinger et al. ............. 178/18 |
| 5,657,258 A | * | 8/1997 | Grewe et al. ............ 364/708.1 |
| 5,691,928 A | * | 11/1997 | Okaya et al. .......... 364/709.05 |
| 5,897,646 A | * | 4/1999 | Suda et al. .................. 707/530 |

FOREIGN PATENT DOCUMENTS

| | | |
|---|---|---|
| JP | 08-286809 A | 11/1996 |
| JP | 09-091083 A | 4/1997 |
| JP | 09-091377 A | 4/1997 |

* cited by examiner

*Primary Examiner*—Steven Saras
*Assistant Examiner*—Srilakshmi Kumar
(74) *Attorney, Agent, or Firm*—Frishauf, Holtz, Goodman, Langer & Chick, P.C.

(57) ABSTRACT

A handwritten data input device has a coordinate detection tablet for detecting writing data input by handwriting using an input pen and a program storage medium. When a predetermined preprocess is required for an input process to accept writing data input by handwriting from the tablet, useless handwritten input can be effectively avoided when the preprocess has not been completed. In the handwritten data input device, a CPU determines whether the preprocess has been completed when the input pen approaches the tablet and, if the preprocess has not been completed, drives a buzzer to generate an alarm tone, thereby notifying the operator that the handwritten input is invalid in advance.

9 Claims, 14 Drawing Sheets

REFERENCE CHARACTER FRAME — "L" IS RECOGNIZED | UP-SHIFTED CHARACTER FRAME — "L" IS RECOGNIZED | DOWN-SHIFTED CHARACTER FRAME — "L" IS RECOGNIZED | LEFT-SHIFTED CHARACTER FRAME — "L" IS RECOGNIZED | RIGHT-SHIFTED CHARACTER FRAME — "4" IS RECOGNIZED

REFERENCE CHARACTER FRAME

"L" IS RECOGNIZED

UP-SHIFTED CHARACTER FRAME

"L" IS RECOGNIZED

DOWN-SHIFTED CHARACTER FRAME

"L" IS RECOGNIZED

LEFT-SHIFTED CHARACTER FRAME

"L" IS RECOGNIZED

RIGHT-SHIFTED CHARACTER FRAME

"4" IS RECOGNIZED

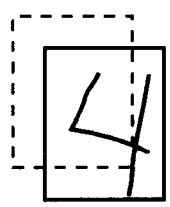
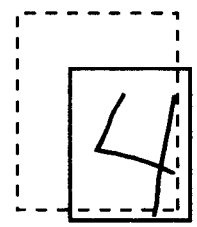
REFERENCE
CHARACTER
FRAME
"L" IS
RECOGNIZED
FIG.15A
EXPANDED
CHARACTER
FRAME
"4" IS
RECOGNIZED
FIG.15B

HANDWRITTEN DATA INPUT DEVICE HAVING COORDINATE DETECTION TABLET

BACKGROUND OF THE INVENTION

The present invention relates to a handwritten data input device allowing handwritten input and a program storage medium for the same.

This application is based on Japanese Patent Application No. 9-74715, filed Mar. 12, 1997 and Application No. 9-96353, filed Apr. 1, 1997, the contents of which are incorporated herein by reference.

In a conventional data input device having a tablet, data is written in character entry columns printed on a document format (form) which is overlaid on the tablet, and character recognition is performed by accepting the data as handwritten data input in predetermined character frames (recognition frames) on the tablet.

When a form is overlaid on the tablet, the form can be filled in regardless of the state of the handwritten data input device.

However, data written in the form which can not be accepted for processing results only in a waste of time if the power supply of the handwritten data input device is OFF, when the apparatus is not ready for an input process to accept handwritten data even if the power supply is ON, or when a writing device other than an exclusive pen is used in the case of an electromagnetic induction type tablet which requires an exclusive pen.

Further, in the conventional data input device having a tablet, data is written in character entry columns printed on the form which is overlaid on the tablet, and character recognition is performed by accepting the data as handwritten data input in predetermined character frames (recognition frames) on the tablet. In this case, the form is overlaid on the tablet such that a reference point printed on the form is registered on a positioning point on the tablet.

However, there has been a problem in that character recognition can not be performed accurately even after such registration is made between the form and the tablet because of a relative shift between the character entry columns on the form and the character frames on the tablet which can be caused by a movement of the form during entry to the form, inaccurate specification of the positioning point, or misalignment of printing on the form.

BRIEF SUMMARY OF THE INVENTION

Accordingly, it is first object of the present invention to avoid useless handwritten input before a preprocess when a predetermined preprocess is required in preparation for an input process to accept data input on a tablet by handwriting.

It is a second object of the invention to make it possible to process handwritten data accurately regardless of a positional shift between an entry sheet of a form or the like and a tablet which may occur when a data input is made on the sheet placed on the tablet.

According to the present invention, there is provided a handwritten data input device having a coordinate detection tablet, comprising:

preprocess means for performing a predetermined preprocess in preparation for an input process to accept data input by handwriting on the tablet;

determination means for determining whether the preprocess has been completed or not when the input by handwriting on the tablet is attempted; and notifying means for notifying that data input is invalid if the determination means determines that the preprocess has not been completed.

According to the present invention, there is provided another handwritten data input device having a coordinate detection tablet, comprising:

first input process means for processing data written in a handwritten entry region of an entry sheet with the entry sheet having the handwritten entry region overlaid on a tablet as writing data input to an input area on the tablet predetermined in association with the entry region;

means for generating a new input area, as a shifted input area at a coordinate which is shifted from a reference input area in a predetermined direction and by a predetermined amount, the reference input area being an input area on the tablet which is predetermined in association with a handwritten entry column on the entry sheet;

second input process means for processing data written in the handwritten entry region on the entry sheet as writing data input to the shifted input area generated by the generation means; and output means for outputting each of the data processed by the first and second input process means as input candidates.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a flow chart showing an operation of the first embodiment initiated when the power supply is turned on;

FIGS. 15A and 15B illustrate examples of character frames and result of recognition.

DETAILED DESCRIPTION OF THE INVENTION

A preferred embodiment of a handwritten data input device according to the present invention will now be described with reference to the accompanying drawings.

First Embodiment

A first embodiment of the present invention will now be described with reference to FIGS. 1 through 5.

Figure 1:
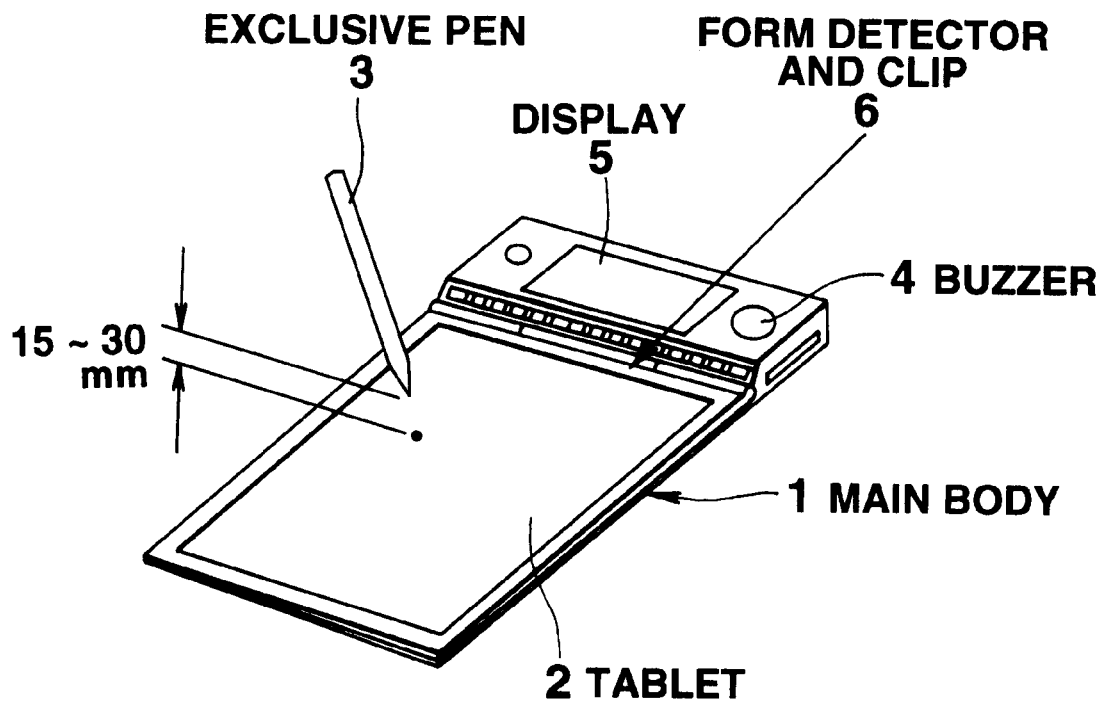
FIG. 1 is a perspective view of a handwritten data input device of a first embodiment according to the present invention.

FIG. 1 is a perspective view of a handwritten data input device according to the first embodiment.

The handwritten data input device is formed in a planar configuration as a whole, and an electromagnetic induction type tablet 2 is mounted on the upper surface of a main body 1 of the apparatus. A pen 3 is exclusively used for the electromagnetic induction type tablet 2. When this exclusive pen 3 is placed in the vicinity of the tablet 2 (e.g., at a distance of in the range from about 15 to 30 mm), a buzzer 4 notifies that a data input will be invalid if a predetermined preprocess has not been completed. A display 5 displays various message data and results of character recognition based on manually input data as candidates. A combination of form detector and clip 6 is a combination of a clip for pressing and securing a form overlaid on the electromagnetic induction type tablet 2 and a form detector for detecting whether a form has been correctly set on the electromagnetic induction type tablet 2. The form detector comprises a microswitch, photosensor or the like.

Figure 2:
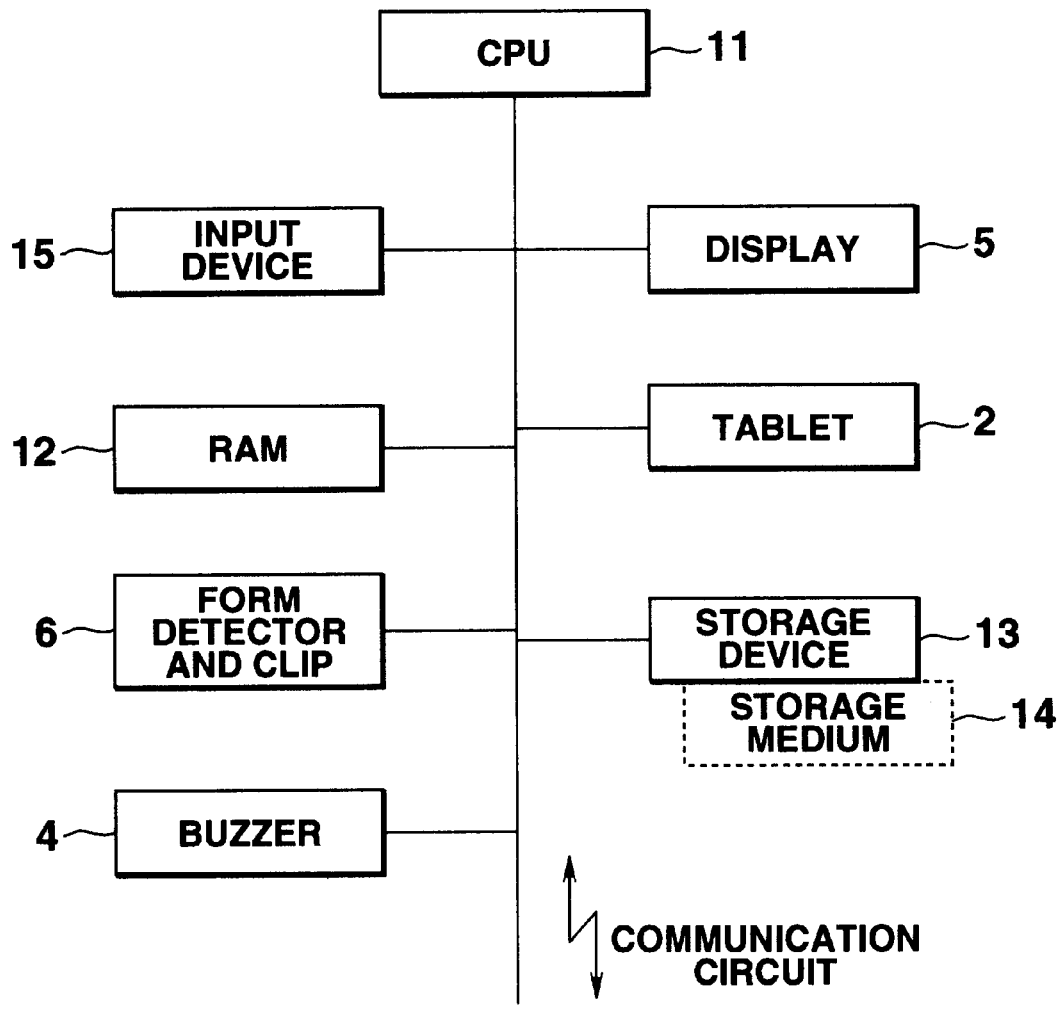
FIG. 2 is a block diagram showing an overall configuration of the handwritten data input device.

FIG. 2 is a block diagram showing an overall configuration of the handwritten data input device.

A CPU 11 is a central processing unit for controlling the operation of the handwritten data input device as a whole in accordance with various programs loaded in a RAM 12. A storage device 13 includes a storage medium 14 in which the operating system, various application programs, data files, character font data and the like are stored in advance and includes a drive system for the same. The storage medium 14 may be provided either fixedly or detachably and is constituted by a magneto-optical storage medium or a semiconductor memory such as a floppy disk, a hard disk, an optical disk and a RAM. The programs and data in the storage medium 14 are loaded into the RAM 12 as needed under the control of the CPU 11. Further, the CPU 11 can receive programs and data transmitted from other apparatuses over a communication link and the like and store them in the storage medium 14. The CPU 11 can also use programs and data stored in other storage media provided in other apparatuses through a communication link and the like.

The CPU 11 is connected through a bus line to the electromagnetic induction type tablet 2, buzzer 4, display 5, combination clip and form detection 6 and an input device 15 which are input/output peripheral devices, and the CPU 11 controls the operations of them according to an input/output program. The input device 15 is a touch panel comprising a keyboard and a touch screen for selecting form types arbitrarily and for inputting various commands.

Figure 3:
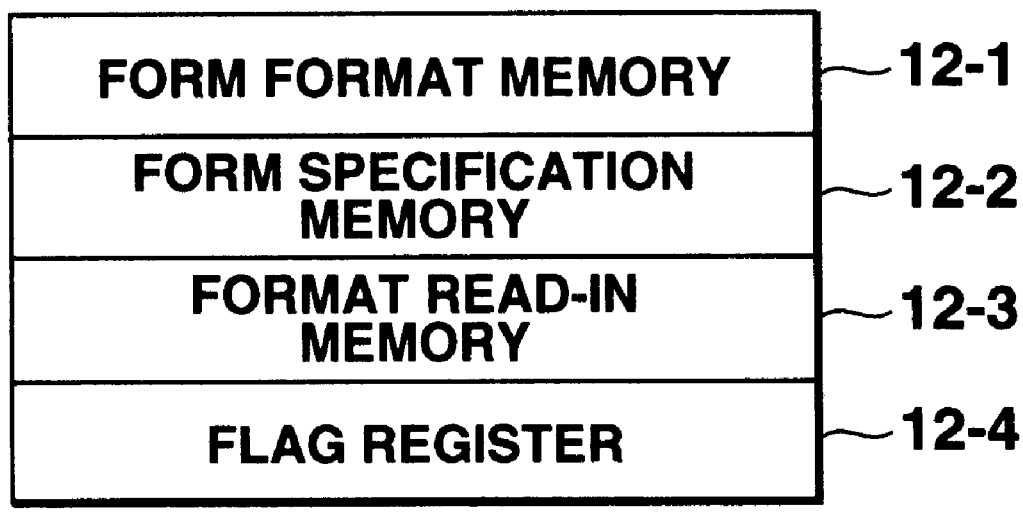
FIG. 3 is a diagram showing contents of a RAM shown in FIG. 2.

FIG. 3 shows contents of the RAM 12. Predetermined memory areas are allocated in the RAM 12 as needed. A form format memory 12-1 is a memory for storing form formats that define handwritten entry columns on various forms as input areas on the electromagnetic induction type tablet 2 depending on the form types. A form specification memory 12-2 is a memory for temporarily storing the type of a form to be set on the electromagnetic induction type tablet 2 which is arbitrarily selected and specified. A format read-in memory 12-3 is a memory for temporarily storing the format of a form read from the form format memory 12-1 based on the contents of the form specification memory 12-2. A flag register 12-4 stores a flag which is ON or OFF depending on whether a predetermined preprocess has been completed or not when the exclusive pen 3 approaches the electromagnetic induction type tablet 2. The CPU 11 activates the buzzer 4 to generate an alarm tone based on the state of this flag.

Next, the operation of the handwritten data input device will be described with reference to the flow chart shown in FIGS. 4 and 5. Programs for achieving various functions shown in the flow chart are stored in the storage medium 14 in the form of program codes that the CPU 11 can read, and the contents of the programs are loaded in the RAM 12.

Figure 4:
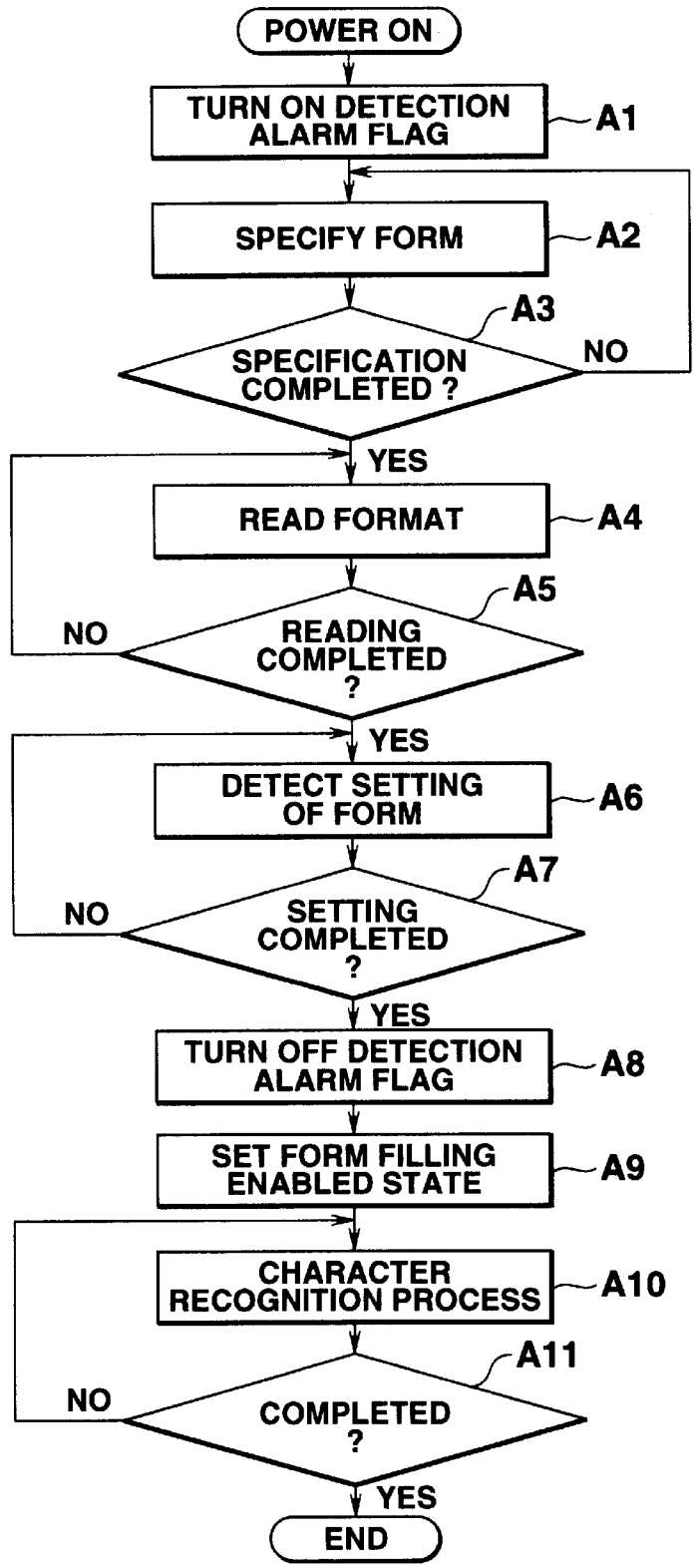

When the power supply is turned on, an operation according to the flow chart in FIG. 4 is initiated. This operation is interrupted at predetermined time intervals to allow an interrupt process according to the flow chart in FIG. 5 to be performed. As the power supply is turned on, the CPU 11 sets the flag (detection alarm flag) in the flag register 12-4 (step A1), enters a state wherein a form type can be specified through a key input (step A2) and stands by until the specification of a form type is completed (step A3). When an input is made to specify a form type, the CPU 11 reads a form format associated with the form type from the form format memory 12-1 and stores it in the format read-in memory 12-3 (step A4). It is in a standby state from the form type is specified and until the reading of the form format is completed (step A5).

After the form format is stored in the format read-in memory 12-3, the process proceeds to the next step A6 where the form is set on the electromagnetic induction type tablet 2. At step A7, it is determined whether the form has been set on the electromagnetic induction type tablet 2 according to a detection signal from the combination clip and form detector 6 and stands by until the setting is completed. In setting the form on the electromagnetic type tablet 2, the operator overlays the form on the electromagnetic induction type tablet 2 such that a reference point printed on the form is aligned with a positioning point on the electromagnetic induction type tablet 2.

The CPU 11 waits until such setting and positioning of the form on the electromagnetic induction type tablet 2 is completed. When the completion of this operation is detected, the CPU 11 resets the detection alarm flag in the flag register 12-4 (step A8) and enters a form entry enabling state (step A9). At step A9, data written in a handwritten entry column on the form is accepted as writing data which has been input to an input area on the electromagnetic type tablet 2 associated therewith according to the form format that defines this handwritten entry column. Then, the CPU 11 recognizes characters in the writing data and performs a process of displaying the result of recognition as a candidate for each character (step A10). Such a character recognition process is repeated until the termination of entry is instructed at step A11.

Figure 5:
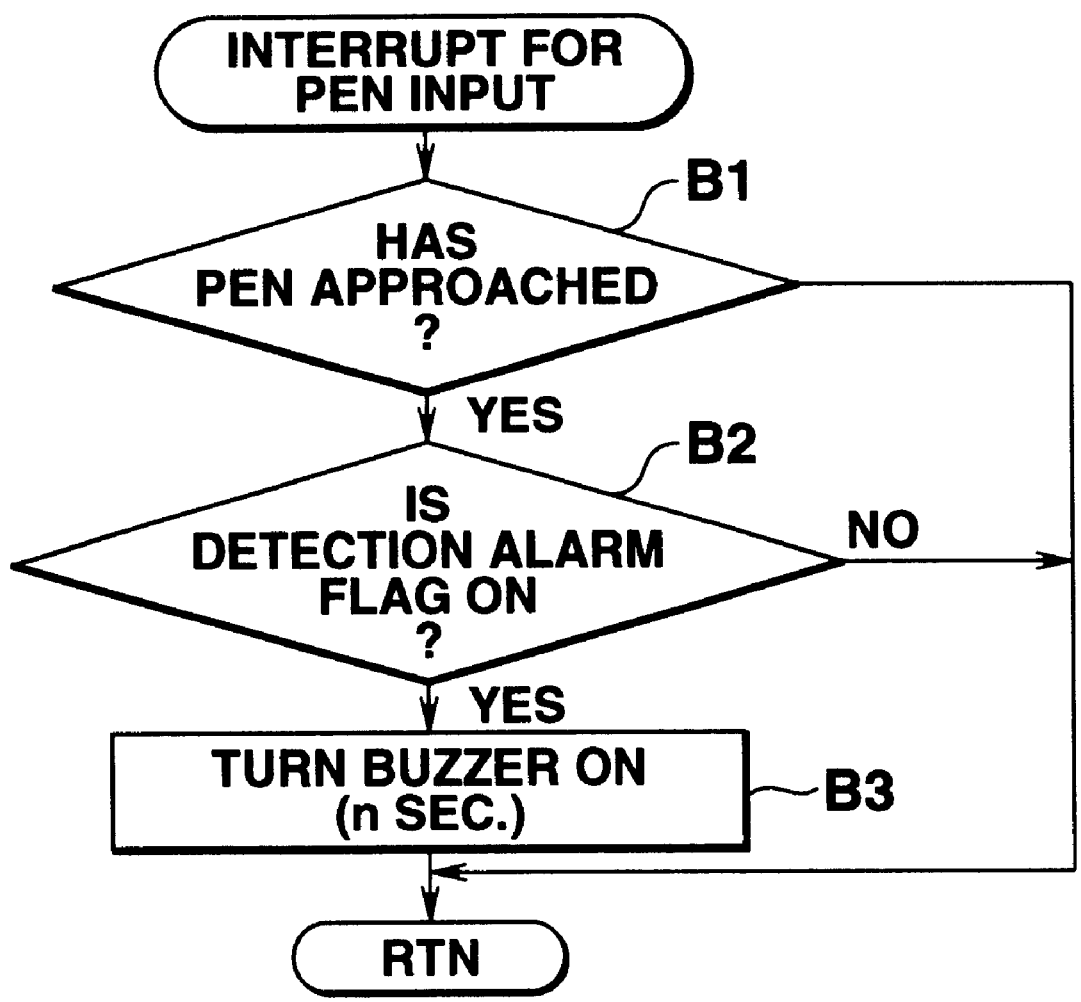
FIG. 5 is a flow chart showing an interrupt process of the first embodiment performed at predetermined time intervals.

While the operation according to the flow chart shown in FIG. 4 is carried out, the CPU 11 periodically performs an interrupt process according to FIG. 5 at predetermined time intervals. When the operator moves the exclusive pen 3 to a position at a distance in the range from about 15 to about 30 mm from the electromagnetic induction type tablet 2 in an intention to fill the form, the electromagnetic induction type tablet 2 detects it. The CPU 11 determines whether the exclusive pen 3 has approached based on an output from the electromagnetic induction type tablet 2 (step B1). When the approach of the exclusive pen 3 is detected, the CPU 11 proceeds to the next step B2 wherein it accesses the flag register 12-4 to determine whether the detection alarm flag is ON or OFF. As described above, the detection alarm flag is set immediately after the power supply is turned on and is reset when an input to specify a form type and reading of a form format associated with the type has been completed and when the form has been set and positioned on the electromagnetic induction type tablet 2. The alarm flag remains on when such preparation has not been completed, i.e., when various preprocesses as described above have not been completed in preparation for acceptance of data written on the form through the electromagnetic induction type tablet 2 and character recognition thereon. Therefore, if the operator places the exclusive pen 3 in the vicinity of the electromagnetic induction type tablet 2 in an attempt to start filling the form before such preprocesses are completed, the buzzer 4 is activated for a predetermined time (n sec.) to generate an alarm tone that notifies the operator that the data input will be invalid (step B3). No alarm tone is generated if the above-described preprocesses have been completed.

As described above, the handwritten data input device of the first embodiment notifies that a data input will be invalid if filling in a form is intended before preprocesses are completed in preparation for acceptance of handwritten data from the electromagnetic induction type tablet 2 for character recognition. This makes it possible to avoid useless data input in advance and eliminates wasteful consumption of forms because there will be no form discarded as a result of improper entry. In other words, an operator can carry out entry efficiently because he or she does not need to confirm that the preparation has been made from a displayed message or the like to avoid useless entry and waste of forms.

Second Embodiment

Figure 6:
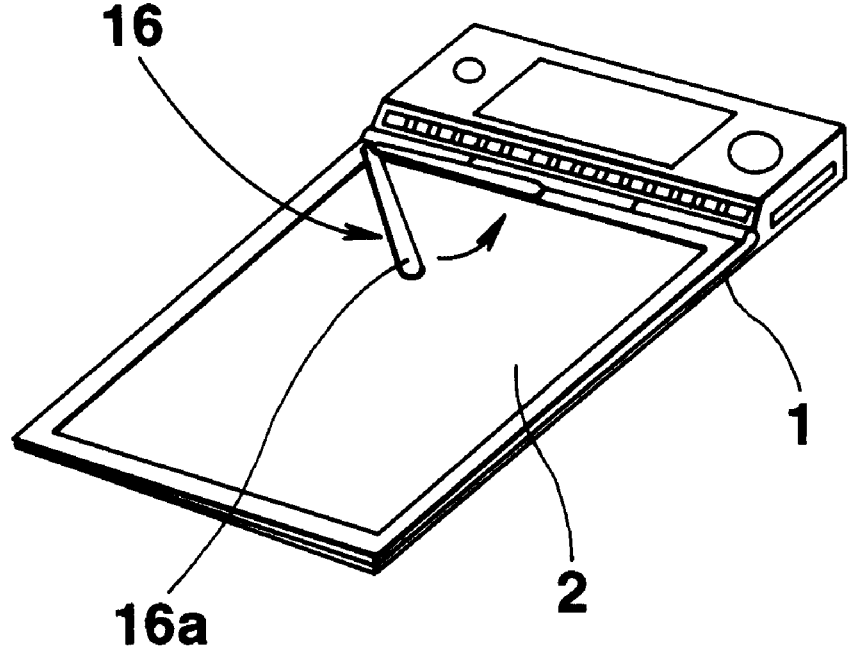
FIG. 6 is a perspective view of a handwritten data input device of a second embodiment according to the present invention.

A second embodiment of the invention will now be described with reference to FIG. 6. While an alarm tone notifies that preparation is in progress in the first embodiment, the second embodiment allows the power-off state to be intuitively recognized.

Specifically, a lever type power switch member 16 includes a movable actuation lever 16a which extends above the upper surface of the electromagnetic induction type tablet 2. One end of the actuation lever 16a is rotatably mounted to the apparatus main body 1, and the other end can move over the upper surface of the electromagnetic induction type tablet 2 as a free end to leave a fan-shaped locus. The ON and OFF states of the power supply are controlled according to the movement of the actuation lever 16a. The power switch member 16 is a power supply switch which is switched off (power off) when the actuation lever 16a is on the upper surface of the electromagnetic induction type tablet 2 and which is switched on (power on) when the actuation lever 16a is rotated in the direction of the arrow in FIG. 6 to expose the upper surface of the electromagnetic induction type tablet 2.

The use of such a power switch member 16 allows an operator to intuitively recognize the power on and off states from the position of the actuation lever 16a and hence makes it possible to avoid useless manual entry in the power off state.

While the above-described embodiments have referred to an electromagnetic induction type tablet as an example, it is obviously possible to use a pressure sensitive tablet, a tablet operated by a touch of a human body, and the like. Although a form is overlaid on the tablet in the above-described embodiments, a form may be set under the tablet if the tablet is transparent. Further, the present invention is not limited to the case wherein a form is overlapped with the tablet and may be applied to a display screen and a tablet overlapped with each other.

Third Embodiment

A third embodiment of the present invention will now be described with reference to FIGS. 7 through 11E.

Figure 7:
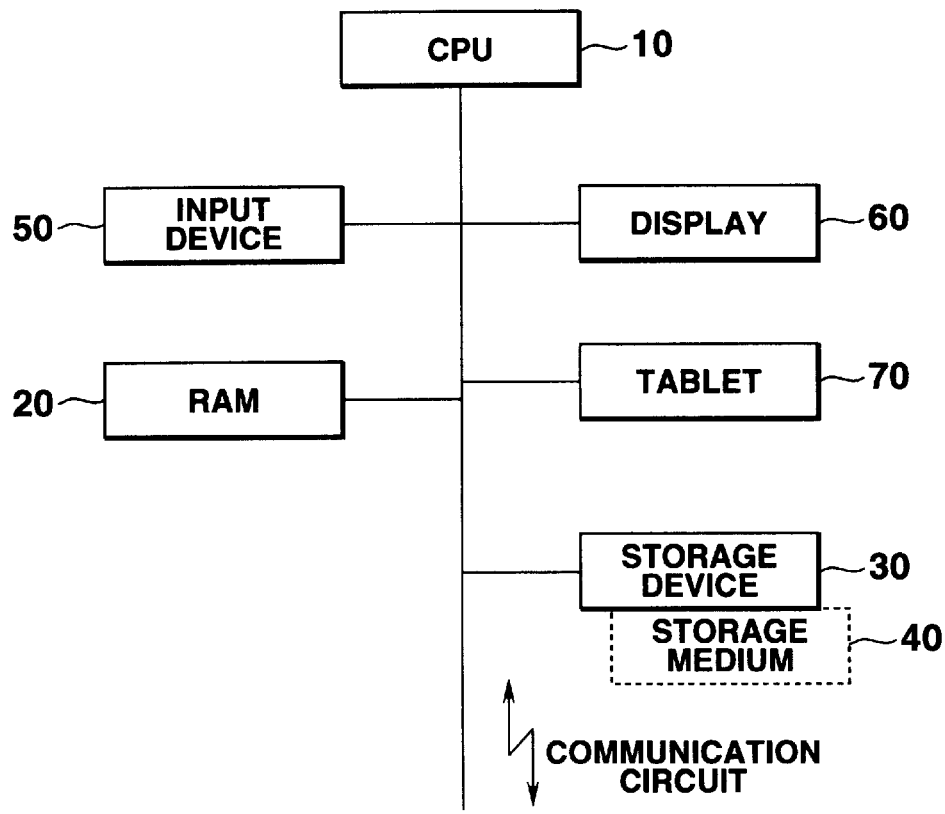
FIG. 7 is a block diagram showing an overall configuration of the handwritten data input device of a third embodiment according to the present invention.

FIG. 7 is a block diagram showing an overall configuration of a handwritten data input device according to the third embodiment.

A CPU 10 is a central processing unit for controlling the operation of the handwritten data input device as a whole in accordance with various programs loaded in a RAM 20. A storage device 30 includes a storage medium 40 in which the operating system, various application programs, data files, character font data and the like are stored in advance and includes a drive system for the same. The storage medium 40 may be provided either fixedly or detachably and is constituted by a magneto-optical storage medium or a semiconductor memory such as a floppy disk, a hard disk, an optical disk and a RAM. The programs and data in the storage medium 40 are loaded into the RAM 20 as needed under the control of the CPU 10. Further, the CPU 10 can receive programs and data transmitted from other apparatuses over a communication link and the like and store them in the storage medium 40. The CPU 10 can also use programs and data stored in other storage media provided in other apparatuses through a communication link and the like.

The CPU 10 is connected through a bus line to an input device 50, a display 60 and a tablet 70 and controls the operation of them according to an input/output program.

The input device 50 includes a pointing device such as a keyboard or a mouse for inputting various commands. The tablet 70 is a coordinate input device formed in a planar configuration as a whole. In a state wherein a form to be described later is overlaid thereon, the input device allows the input of handwritten data by detecting the position of the coordinate of a required item filled in a handwritten entry column of the form using a writing device based on the writing pressure transferred thereto through the form. The form is a sheet of paper or a film sheet which accepts writing thereon, having handwritten entry columns printed thereon in a predetermined format. The CPU 10 recognizes characters based on the writing data (coordinate string data) input from the tablet 70 and converts the data into character codes to output a display of candidates for recognition on a text screen of the display 60.

Figure 8:
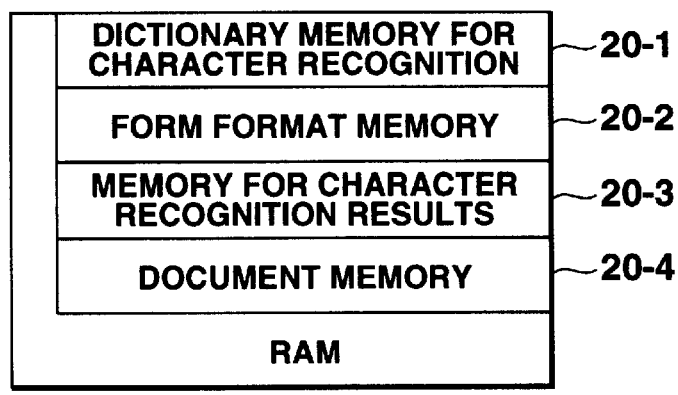
FIG. 8 is a diagram showing contents of a RAM shown in FIG. 7.

FIG. 8 shows contents of the RAM 20. Various memory regions are allocated in the RAM 20 as needed. A dictionary memory 20-1 for character recognition is referred to when the writing data input from the tablet 70 is subjected to character recognition and wherein a character code for each character is stored in association with a writing pattern. A form format memory 20-2 stores form formats that define the handwritten entry columns of forms in association with various forms, and a handwritten entry column of a form is associated with an input area (character frame) on the tablet 70 according to the form format. In this case, the CPU 10 uses an input area on the tablet 70 determined by a form format as a reference character frame and generates other character frames in coordinates displaced in vertical and horizontal directions from the coordinate of the reference character frame by predetermined amounts (hereinafter referred to as "shifted character frames"). Specifically, it generates character frames shifted upwardly, downwardly, to the left and to the right from the reference character frame. Based on the five character frames in total, i.e., the reference character frame and the four shifted character frames, the CPU 10 extracts writing data for one character to recognize the character and provides a guidance display showing the results of conversion as candidates for recognition. The character recognition result memory 20-3 temporarily stores the conversion results obtained by the character recognition based on the five character frames in total. When any one of the candidate is finally determined, the determined candidate is stored in the document memory 20-4.

The operation of the handwritten data input device will now be described with reference to the flow charts shown in FIGS. 9 and 10. Programs for performing various functions described in the flow chart are stored in the storage medium 40 in the form of program codes which can be read by the CPU 10, and the contents of the same are loaded in a work memory (not shown) in the RAM 20. This equally applies to flow charts for other embodiments to be described later.

Figure 9:
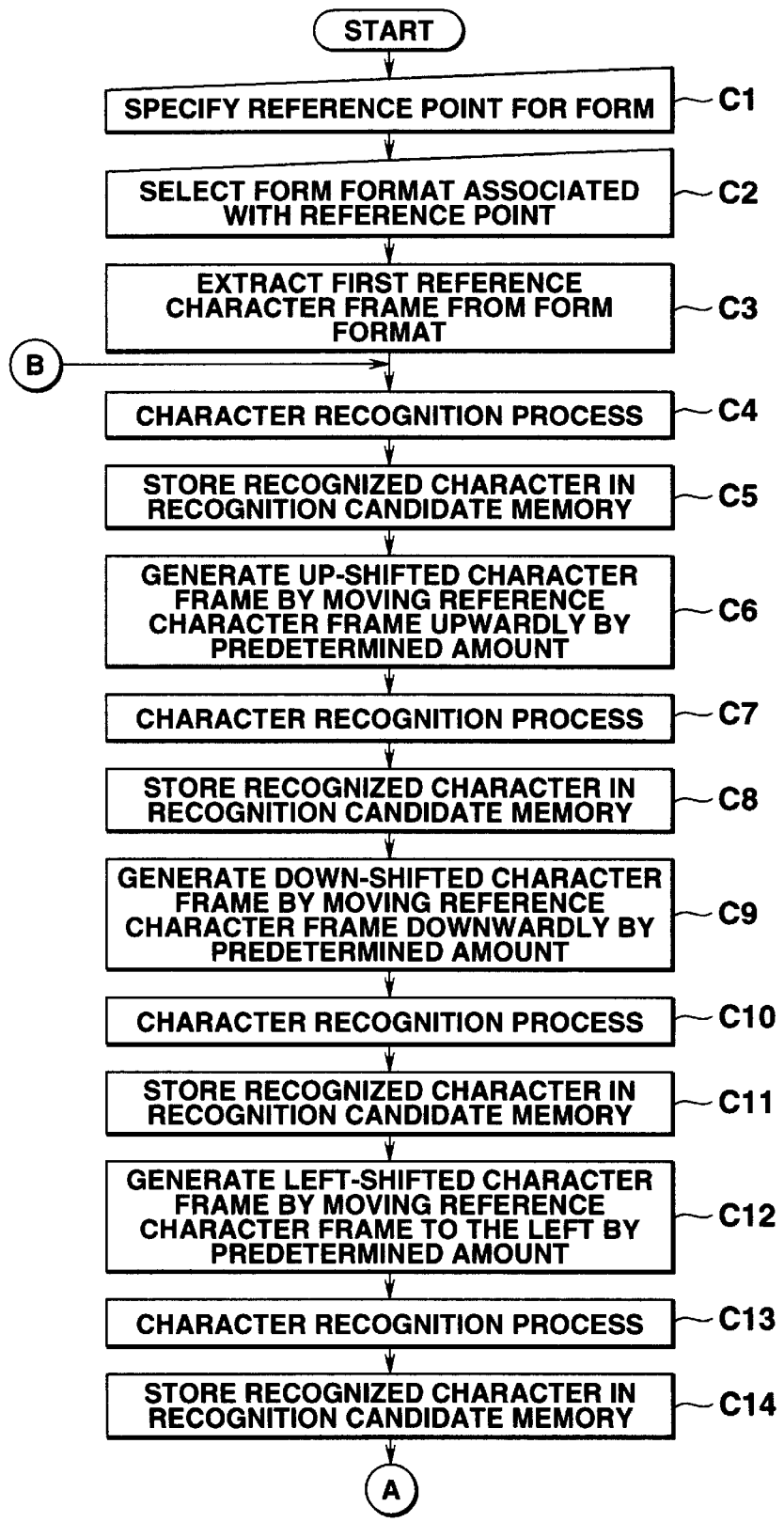
FIGS. 9 and 10 show a flow chart of the third embodiment explaining the operation of an input process on data input by handwriting on a form overlaid on a tablet.
Figure 10:
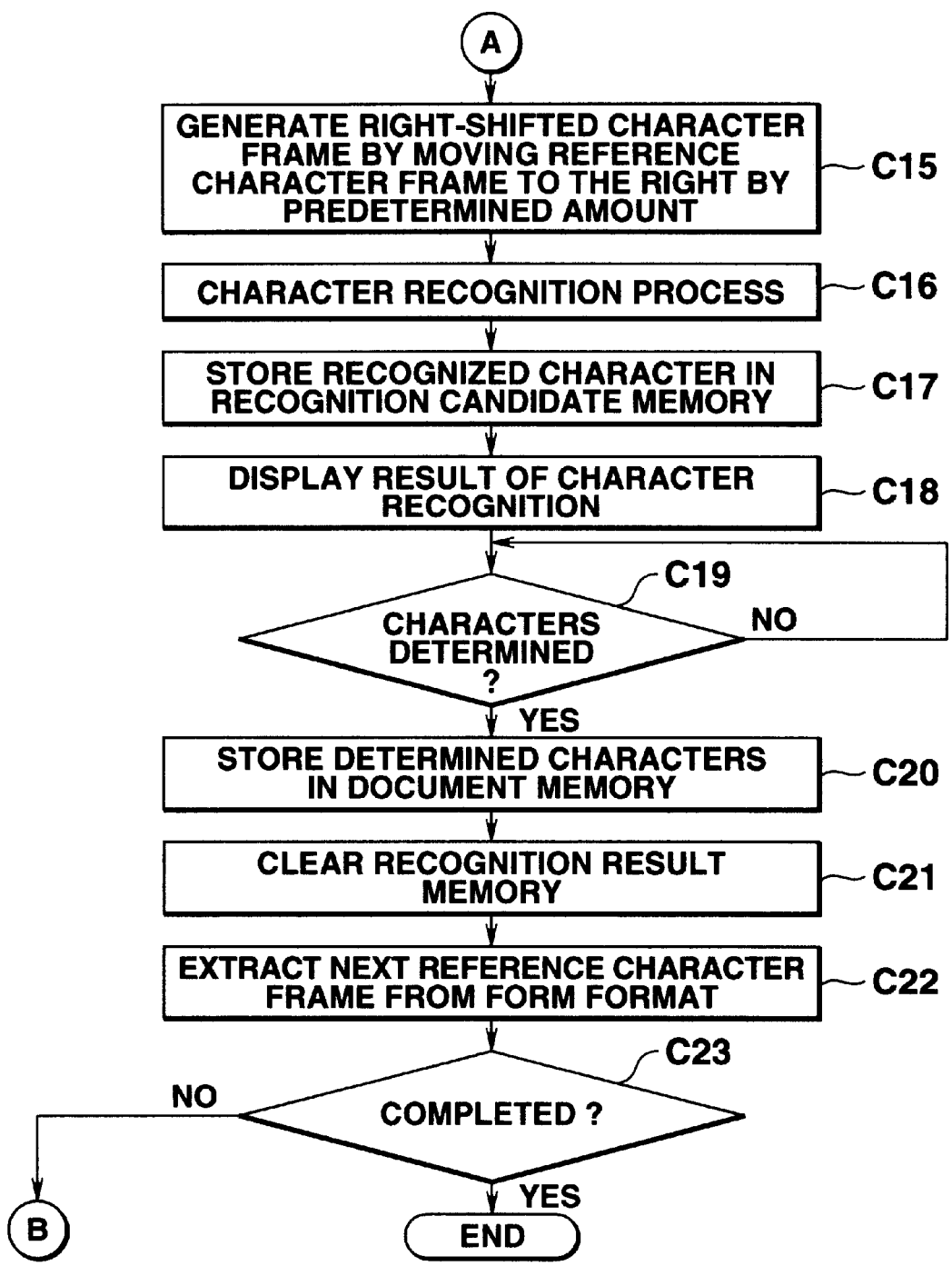
Figure 11A:
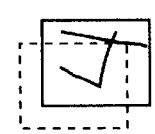
FIGS. 11A, 11B, 11C, 11D and 11E respectively illustrate a reference character frame, an up-shifted character frame, a down-shifted character frame, a left-shifted character frame and a right-shifted character frame obtained by moving the reference character frames in predetermined directions along with the result of character recognition in each character frame.
Figure 11B:
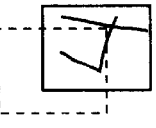
Figure 11C:
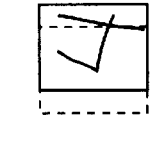
Figure 11D:
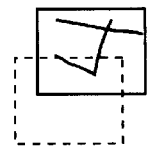
Figure 11E:
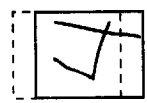

FIGS. 9 and 10 show a flow chart of a process of inputting data handwritten on the tablet 70 through the form. Form formats associated with various forms are registered in advance in the form format memory 20-2.

When a desired form is overlaid on the tablet 70 and a form reference point (e.g., two diagonal points) marked on the form in advance is specified by a touch-input, the CPU 10 fetches the coordinate of the position of the form reference point input from the tablet 70 (step C1), looks up the contents of the form format memory 20-2 based on the coordinate and retrieves a form format associated therewith (step C2). That is, form reference points and form formats are associated with each other in the form format memory 20-2, and a form type is selected based on a form reference point.

A first reference character frame is extracted from the form format thus selected (step C3). Writing data for one character is extracted based on this character frame, and the dictionary memory 20-1 for character recognition is referred to based on the writing data to perform a character recognition process (step C4). The result of the conversion is stored in the character recognition result memory 20-3 (step C5). When no character can be recognized, an "unrecognizable" code indicating such a stare is stored in the character recognition result memory 20-3.

Next, a new character frame (up-shifted character frame) is generated in the position of a coordinate which is displaced upwardly from the reference character frame by a predetermined amount (step C6). The character recognition process is performed again based on the up-shifted character frame (step C7), and the result of the conversion is stored in the character recognition result memory 20-3 (step C8).

Next, a new character frame (down-shifted character frame) is generated in the position of a coordinate which is displaced downwardly from the reference character frame by a predetermined amount (step C9). The character recognition process is performed based on the down-shifted character frame (step C10), and the result of the conversion is stored in the character recognition result memory 20-3 (step C11).

Similarly, a new character frame (left-shifted character frame) is generated in the position of a coordinate which is displaced to the left from the reference character frame by a predetermined amount (step C12). The character recognition process is performed again based on the left-shifted character frame (step C13), and the result of the conversion is stored in the character recognition result memory 20-3 (step C14).

Finally, a new character frame (right-shifted character frame) is generated in the position of a coordinate which is displaced to the right from the reference character frame by a predetermined amount (step C15). The character recognition process is performed based on the right-shifted character frame (step C16), and the result of the conversion is stored in the character recognition result memory 20-3 (step C17).

Thus, results of character recognition corresponding to the up-, down-, left- and right-shifted character frames are stored in the character recognition result memory 20-3 in addition to the reference character frame, and the contents of the character recognition result memory 20-3 are read to provide a guidance display to show candidates for recognition (step C18). FIGS. 11A through 11E show character recognition performed based on the reference character frame, up-shifted character frame, down-shifted character frame, left-shifted character frame and right-shifted character frame, respectively. When a figure "4" is written, while it is erroneously recognized as "L" in the reference character frame as a result of misalignment between the form and the tablet 70 or printing misalignment of the form, the right-shifted character frame results in accurate recognition of "4". Then, the operator can perform an input operation to select the result of recognition in the right-shifted character frame as a determined candidate from among the displayed candidates. Upon such a defining operation (step C19), the determined candidate is stored in the document memory 20-4 (step C20) and the contents of the character recognition memory 20-3 are cleared (step C21). Then, a next character frame is extracted from the form format (step C22), and it is determined whether it is beyond the final character frame or not to determine whether the input of the form is completed (step C23). This is the handwritten input of a first one character and, for a form on which two or more characters are to be input, the process returns to step C4 to repeat the above-described operation for each character.

As described above, this handwritten data input device according to the third embodiment performs character recognition each time a required item is entered by filling each handwritten entry column on a form with one character in each of shifted character frames obtained by shifting a reference character frame upwardly, downwardly, to the left and to the right. As a result, character recognition can be accurately performed in any one of the five character frames even in the case of misalignment between the form and the tablet 70 or in the case of a shift of the form during writing. That is, a positional shift between the form and the tablet 70 can be absorbed by the shift of the character frame except for very large shifts, and character recognition can be performed accurately with such a shift left uncorrected.

Fourth Embodiment

A fourth embodiment of the present invention will now be described with reference to FIG. 12 and FIGS. 13A through 13D. In the fourth embodiment, the difference between the coordinates of a shifted character frame in which a determined character is recognized and a reference character frame is detected, and subsequent reference character frames are corrected based on the coordinate difference. When a next character is determined, if the character frame in which the determined character is recognized is a reference character frame which has been corrected as described above, the reference character frame is not corrected. If the character frame is a shifted character frame, the difference between the coordinates of the corrected reference character frame and the shifted character frame is further detected, and an operation of correcting subsequent reference character frames based on the coordinate difference is repeated for each character to gradually absorb misalignment between the form and the tablet.

Figure 12:
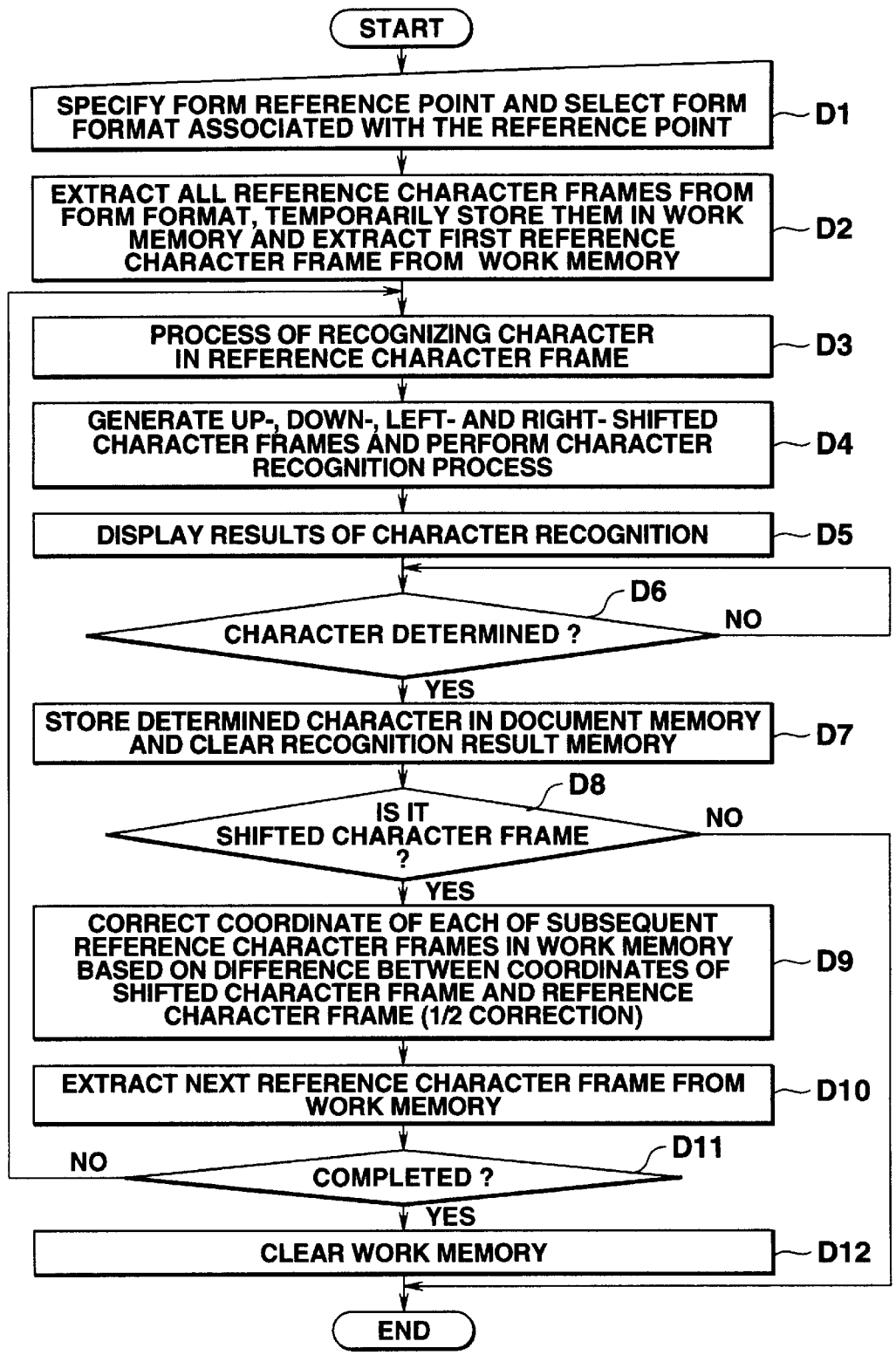
FIG. 12 is a schematic flow chart of a fourth embodiment according to the present invention.

FIG. 12 is a flow chart showing the operation of the fourth embodiment.

Steps D1 through D7 are steps which are basically the same as steps C2 through C21 shown in FIG. 9 and are illustrated in a simplified manner. Specifically, when a form reference point is touch-input, a form format associated therewith is retrieved (step D1), all reference character frames are extracted from the form format and are temporarily stored in a work memory (not shown) and, at the same time, a first reference character frame is fetched from the work memory (step D2). Then, character recognition is carried out based on the reference character frame (step D3); up-, down-, left- and right-shifted character frames are generated; and character recognition is performed based on each of the shifted character frames (step D4). The results of character recognition are then displayed (step D5) and any one of the candidates is selected as a determined candidate (step D6). The determined character is stored in the document memory 20-4, and the contents of the character recognition result memory 20-3 are cleared (step D7).

When the first one character is thus determined, it is determined at the next step D8 whether the character frame used for the recognition of the determined character is a shifted character frame or the reference character frame. If it is the reference character frame, it is determined that there is no positional shift of the form, and the process proceeds to step D10. At step D10, a next reference character frame is fetched from the work memory and it is determined whether the final character frame has been exceeded or not (whether the input to the form has completed) (step D11). If not, the process returns to step D3. Thus, the process proceeds to a process of recognizing a next handwritten character wherein character recognition is performed in up-, down-, left- and right-shifted character frames in addition to the reference character frame.

When any candidate is selected as a determined candidate from among resultant candidates for recognition, if the character frame in which the determined character is recognized is a sifted character frame, this fact is detected at step D8 to cause the process to proceed to step D9. At step D9, the difference (displacement) between the coordinates of the shifted character frame in which the determined character is recognized and the reference character frame in the work memory is detected, and each of subsequent reference character frames in the work memory is corrected based on the coordinate difference. In this case, correction is made by an amount which is one-half of the displacement. Then, a next character frame is fetched from the work memory to repeat the above-described operation back on step D3 until step D11 detects that the input to the form has been completed. Therefore, the character recognition process based on a reference character frame performed at this stage is based on corrected reference character frames. When the completion of input to the form is detected, the contents of the work memory (the coordinates of reference character frames) are cleared (step D12).

Figure 13A:
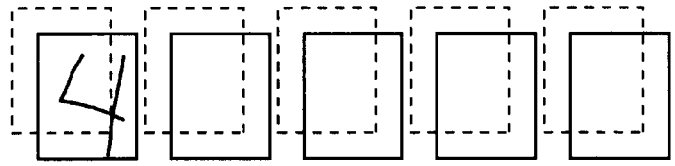
FIGS. 13A, 13B, 13C and 13D illustrate examples of character frames and result of recognition.
Figure 13B:
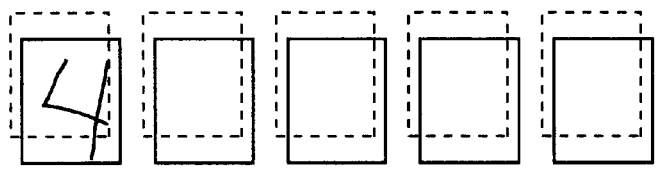
Figure 13C:
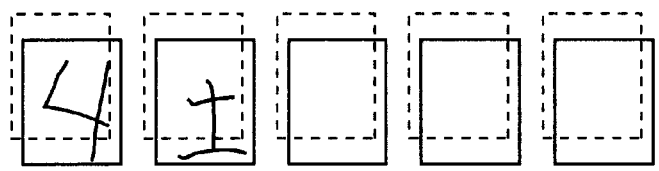

FIGS. 13A through 13D shows a specific example of this embodiment. FIG. 13A shows a state wherein the coordinate of a reference character frame (broken line) is shifted to the left from a handwritten entry column of a form (solid line). In this case, if a candidate "4" recognized in a left-shifted character frame is selected as a determined character as in the above-described first embodiment, based on the difference between the coordinates of the right-shifted character frame and the reference character frame (displacement), subsequent reference character frames are corrected by an amount which is one-half the displacement to the right as shown in FIG. 13B.

Figure 13D:
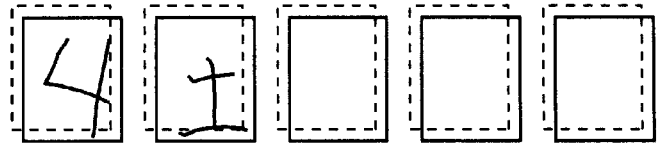

Then, if "±" is input by handwriting as the next character (see FIG. 13C) and is recognized as "+" and "±" in the corrected reference character frame and the corrected down-shifted character frame, respectively, "±" as recognized in the down-shifted character frame is selected as a determined character. Then, subsequent reference character frames are subjected to a downward ½ correction as shown in FIG. 13D. This makes it possible to gradually absorb misalignment between a handwritten entry column of a form and the reference character frame on the tablet 70.

Fifth embodiment

A fifth embodiment of the present invention will now be described with reference to FIGS. 14, 15A and 15B. While a reference character frame is shifted upward, downward, to the left and to the right in the third and fourth embodiments, a reference character frame is enlarged in the present embodiment.

Figure 14:
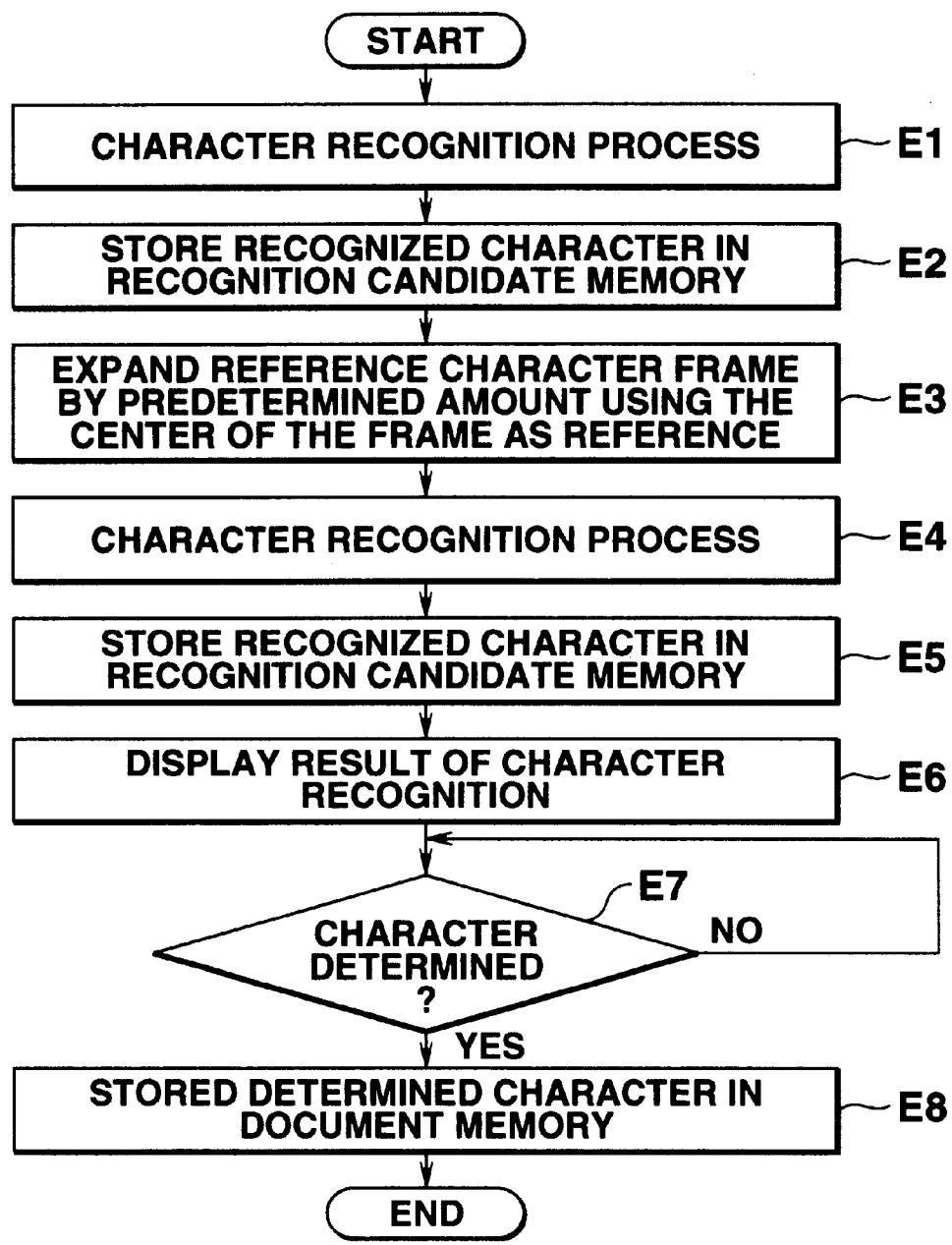
FIG. 14 is a schematic flow chart of a fifth embodiment according to the present invention.

FIG. 14 is a flow chart showing an operation characteristic of the present embodiment. The operation is initiated each time data for one character is input by handwriting. First, a character recognition process is performed in a reference character frame in a form format (step E1). The result of the recognition is stored in the character recognition result memory 20-3 (step E2). Next, the character frame is enlarged to a predetermined size using the center of the reference character frame as a reference (step E3). While the reference character frame is enlarged with similarity maintained, any method of enlargement may be used including enlarging only the shorter sides or enlarging only the longer sides. Character recognition is carried out based on enlarged character frames as a result of such enlargement (step E4), and the results of the recognition are stored in the character recognition result memory 20-3 (step E5). A list of the results of recognition in the character recognition result memory 20-3 is displayed (step E6), and any one of the candidates is selected as a determined candidate (step E7). Then, the determined character is stored in the document memory 20-4. Such an operation is repeated for each character.

The enlargement of a reference character frame as described above also makes it possible to absorb any positional shift of a form. FIGS. 15A and 15B show specific examples of this embodiment wherein a reference character frame is enlarged into a similar character frame. A character which has been erroneously recognized in the reference character frame as shown in FIG. 15A can be correctly recognized in the enlarged character frame (see FIG. 15B).

Although the third to fifth embodiments have referred to a form overlaid on the tablet, a form may be set under the tablet if a transparent tablet is used. Further, the tablet may be an electromagnetic induction type tablet. Furthermore, while characters in handwritten data input from the tablet are subjected to character recognition one by one in the above embodiments, it is possible to limit the operation to simple extraction of characters from handwritten data one by one. Moreover, handwritten input is not limited to characters, and graphic patterns, symbols and the like may be input.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as determined by the appended claims and their equivalents.

What is claimed is:

1. A handwritten data input device comprising:
    an electromagnetic induction-type tablet on which a form sheet is placed, and which detects coordinates at which data is written into the form sheet;
    format defining means for defining in said tablet a data writing area that corresponds to a handwriting data entry box of the form sheet, when the form sheet on which the handwriting data entry box is formed is placed on said tablet;
    a detector that detects when a user is about to write data into the form sheet placed on the tablet by sensing that an input pen is approaching said tablet;
    determination means for determining whether said format defining means has defined the data writing area when the detector detects that the user is about to write data into the form sheet on the tablet; and
    indicating means for indicating that a data write process will be invalid when said determination means determines that said format defining means has not yet defined the data writing area.

2. A recording medium storing a computer program for operating a computer in connection with an electromagnetic induction-type tablet on which a form sheet is placed, wherein said tablet detects coordinates at which data is written into the form sheet and includes a detector that detects when a user is about to write data into the form sheet placed on the tablet by sensing that an input pen is approaching said tablet, and wherein said computer program enables said computer to function as:
    format defining means for defining in said tablet a data writing area that corresponds to a handwriting data entry box of the form sheet, when the form sheet on which the handwriting data entry box is formed is placed on said tablet;
    determination means for determining whether said format defining means has defined the data writing area when the detector detects that the user is about to write data into the form sheet on the tablet; and
    indicating means for indicating that a data write process will be invalid when said determination means determines that said format defining means has not yet defined the data writing area.

3. A handwritten data input device comprising:
    a tablet on which a form sheet is placed, and which detects coordinates at which data is written into the form sheet;
    first reference frame generating means for generating a reference frame for character recognition within a predetermined area in the tablet corresponding to a data writing frame based on a type of the form sheet placed on the tablet;
    second reference frame generating means for shifting the reference frame generated by said first reference frame generating means by a predetermined distance in predetermined directions so as to generate the reference frame at a plurality of different locations;
    recognition means for recognizing a character from the data written into the form sheet placed on said tablet each time the reference frame is generated by said first and second reference frame generating means, based on the coordinates of the data detected by the tablet within each of the generated reference frames; and
    output means for outputting a plurality of recognition data produced by said recognition means as input candidates to be selected by a user.

4. The handwritten data input device according to claim 3, wherein said second reference frame generating means comprises means for generating a first shifted reference frame by shifting the reference frame leftward by a predetermined amount, a second shifted reference frame by shifting the reference frame rightward by a predetermined amount, a third shifted reference frame by shifting the reference frame upward by a predetermined amount, and a fourth shifted reference frame by shifting the reference frame downward by a predetermined amount.

5. The handwritten data input device according to claim 3, further comprising:
    means for detecting a direction of shift and an amount of shift of the reference frame generated by said second reference frame generating means at one of the plurality of different locations in accordance with a selected one of the input candidates selected by the user; and
    means for correcting a position of the reference frame based on the detected direction of shift and the detected amount of shift.

6. A handwritten data input device comprising:
    a tablet on which a form sheet is placed, and which detects coordinates at which data is written into the form sheet;
    first reference frame generating means for generating a reference frame for character recognition within a predetermined area in the tablet corresponding to a data writing frame based on a type of the form sheet placed on the tablet;
    second reference frame generating means for gradually enlarging the reference frame generated by said first reference frame generating means by a predetermined amount in a predetermined direction or by a predetermined amount while maintaining directional similarity so as to generate a plurality of enlarged reference frames;
    recognition means for recognizing a character from the data written into the form sheet placed on said tablet each time one of the reference frame and the enlarged reference frames are generated by said first and second reference frame generating means, respectively, based on the coordinates of the data detected by the tablet within each of the reference frame and the enlarged reference frames; and
    output means for outputting a plurality of recognition data produced by said-recognition means as input candidates to be selected by a user.

7. A recording medium storing a computer program for operating a computer in connection with a tablet on which a form sheet is placed, wherein said tablet detects coordinates at which data is written into the form sheet, and wherein said computer program enables said computer to function as:
    first reference frame generating means for generating a reference frame for character recognition within a predetermined area in the tablet corresponding to a data writing frame based on a type of the form sheet placed on the tablet;

second reference frame generating means for shifting the reference frame generated by said first reference frame generating means by a predetermined distance in predetermined directions so as to generate the reference frame at a plurality of different locations;

recognition means for recognizing a character from the data written into the form sheet placed on said tablet each time the reference frame is generated by said first and second reference frame generating means, based on the coordinates of the data detected by the tablet within each of the generated reference frames; and output means for outputting a plurality of recognition data produced by said recognition means as in-put candidates to be selected by a user.

8. A recording medium storing a computer program for operating a computer in connection with a tablet on which a form sheet is placed, wherein said tablet detects coordinates at which data is written into the form sheet, and wherein said computer program enables said computer to function as:

first reference frame generating means for generating a reference frame for character recognition within a predetermined area in the tablet corresponding to a data writing frame based on a type of the form sheet placed on the tablet;

second reference frame generating means for gradually enlarging the reference frame generated by said first reference frame generating means by a predetermined amount in a predetermined direction or by a predetermined amount while maintaining directional similarity so as to generate a plurality of enlarged reference frames;

recognition means for recognizing a character from the data written into the form sheet placed on said tablet each time one of the reference frame and the enlarged reference frames are generated by, said first and second reference frame generating means, respectively, based on the coordinates of the data detected by the tablet within each of the reference frame and the enlarged reference frames; and output means for outputting a plurality of recognition data produced by said recognition means as input candidates to be selected by a user.

9. A handwritten data input device comprising:

a tablet on which a form sheet is placed, and which outputs a coordinate signal in accordance with a location where data is written into the form sheet;

a format memory configured to store format data defining a data writing area in said tablet, which corresponds to a handwriting data entry box of the form sheet, the format data depending on the type of the form sheet;

a type specifying device configured to specify the type of the form sheet placed on the tablet; format data reader configured to read the format data of the type of the form sheet specified by the input device from said format memory;

a written data input device configured to input written data which is written in the data writing area when data is written into the form sheet placed on the tablet;

a character recognition circuit configured to recognize characters from the written data input by said written data input device;

a detector configured to detect that a user is about to write data into the form sheet placed on said tablet;

a determining circuit configured to determine whether said format reader has completed reading of the format data from said format memory when the detector detects that the user is about to write data into the form sheet placed on the tablet; and an indicator configured to indicate that a data write process will be invalid when said determining circuit determines that said format defining means has not completed reading of the format data from said format memory.

* * * * *